United States Patent [19]

Sydansk

[11] Patent Number: 4,779,680
[45] Date of Patent: * Oct. 25, 1988

[54] HYDRAULIC FRACTURING PROCESS USING A POLYMER GEL

[75] Inventor: Robert D. Sydansk, Littleton, Colo.

[73] Assignee: Marathon Oil Company, Findlay, Ohio

[*] Notice: The portion of the term of this patent subsequent to Aug. 25, 2004 has been disclaimed.

[21] Appl. No.: 50,609

[22] Filed: May 13, 1987

[51] Int. Cl.$^4$ .............................................. E21B 43/26
[52] U.S. Cl. .................................... 166/300; 166/308; 252/8.551
[58] Field of Search ............... 166/294, 295, 300, 308; 252/8.551

[56] References Cited

U.S. PATENT DOCUMENTS

| Re. 321,114 | 4/1986 | Argabright et al. | 166/252 |
|---|---|---|---|
| 3,816,151 | 6/1974 | Podlas | 106/194 |
| 3,938,594 | 2/1976 | Rhudy et al. | 166/308 |
| 4,137,182 | 1/1979 | Golinkin | 252/8.551 |
| 4,552,217 | 11/1985 | Wu et al. | 166/270 |
| 4,636,572 | 1/1987 | Hudson et al. | 556/2 |
| 4,644,073 | 2/1987 | Mumallah et al. | 556/2 |
| 4,683,949 | 8/1987 | Sydansk et al. | 166/295 X |
| 4,688,639 | 8/1987 | Falk | 166/308 X |

OTHER PUBLICATIONS

Von Erdman, "Condensation of Mononuclear Chromium (III) Salts to Polynuclear Compounds,"Das Leder, Eduard Roether Varlag, Darmstadt, Germany, 1963, v. 14, pp. 249–266.

Udy, Marvin J., Chromium Vol. 1: Chemistry of Chromium and Its Compounds, Reinhold Publ. Corp., N.Y., 1956, pp. 229–233.

Cotton and Wilkinson, Advanced Inorganic Chemistry 3rd Ed., John Wiley & Sons, Inc., N.Y., 1972, pp. 836–839.

Shuttleworth and Russel, Journal of the Society of Leather Trades' Chemists, "The Kinetics of Chrome Tannage Part I.," United Kingdom, 1965, v. 49, pp. 133–154.

Shuttleworth and Russel, Journal of The Society of Leather Trades' Chemists, "Part III.," United Kingdom, 1965, v. 49, pp. 251–260.

Shuttleworth and Russel, Journal of The Society of Leather Trades' Chemists, "Part IV.," United Kingdom, 1965, v. 49, pp. 261–268.

*Primary Examiner*—George A. Suchfield
*Attorney, Agent, or Firm*—Jack L. Hummel; Rodney F. Brown

[57] ABSTRACT

A subterranean hydrocarbon-bearing formation is hydraulically fractured using a crosslinked polymer gel as a fracturing fluid. The gel comprises a high molecular weight, water-soluble, carboxylate-containing polymer and a chromic carboxylate complex crosslinking agent. The gel components are premixed at the surface and injected into a wellbore in fluid communication with the formation at a pressure sufficient to hydraulically fracture the formation.

14 Claims, No Drawings

HYDRAULIC FRACTURING PROCESS USING A POLYMER GEL

BACKGROUND OF THE INVENTION

1. Technical Field

The invention relates to a process for hydraulically fracturing a subterranean hydrocarbon-bearing formation and more particularly to a process for fracturing the formation with a crosslinked polymer gel.

2. Background Information

The productivity or injectivity of a wellbore in fluid communication with a subterranean hydrocarbon-bearing formation may be undesirably low due to a number of causes, including low permeability of the formation rock, placement of casing cement, plugging by previously injected materials, clay damage, or produced fluid damage. Productivity or injectivity may be increased by hydraulically fracturing the formation.

Hydraulic fracturing generally entails injecting a fluid into the wellbore at a sufficient rate and pressure to overcome the tensile strength of the formation and the overburden pressure. The injected fluid creates cracks or fractures extending from the wellbore out into the formation which are usually propped open with a solid proppant entrained in the fluid. The fractures permit the flow of hydrocarbons and other fluids into or out of the wellbore.

U.S. Pat. No. 3,816,151 to Podlas, U.S. Pat. No. 3,938,594 to Rhudy et al and U.S. Pat. No. 4,137,182 to Golinkin disclose hydraulic fracturing processes using a number of crosslinked polymer solutions as fracturing fluids. The inventor has discovered that many of the crosslinking reactions prescribed by the art are very difficult to control. Uncontrolled crosslinking can occur too rapidly, producing a non-homogeneous suspension of highly viscous gel balls in a watery solution, or in the other extreme crosslinking can fail to occur at all. In either case, the result is an ineffective fracturing fluid.

A process is needed for hydraulically fracturing a subterranean hydrocarbon-bearing formation with a stable homogeneous viscous fracturing fluid having satisfactory performance properties to meet the demands of the fracture treatment.

SUMMARY OF THE INVENTION

The present invention provides a process for hydraulically fracturing a subterranean hydrocarbon-bearing formation with a flowing gel. The components which make up the flowing gel are a high molecular weight water-soluble carboxylate-containing polymer, an aqueous solvent, and a crosslinking agent containing a chromic carboxylate complex. The gel may further comprise a propping agent and/or a breaker.

The gel is prepared by premixing the gel components at the surface to form a gelation solution. The solution is crosslinked and the resulting gel is injected into the formation via a wellbore in fluid communication with the wellbore at a pressure sufficient to induce hydraulic fracturing of the formation.

The specific polymer/crosslinking agent system employed in the gel of the present invention is particularly advantageous because it enables the practitioner to prepare a gel for fracture treatments which has superior properties over those gels known in the art. The practitioner controls the gel composition and gelation conditions in a straightforward manner to produce a uniform stable viscous gel having desirable predetermined gel performance properties. The desirable performance properties of low friction loss, low fluid loss, high proppant carrying capacity, high shear thinning, high stability, ang gel reversibility, which are achieved by the present invention, ensure a successful fracture treatment.

DESCRIPTION OF PREFERRED EMBODIMENTS

The gel employed in the fracturing process of the present invention comprises a polymer, an aqueous solvent, and a crosslinking agent. The term "gel" as used herein is directed to a continuous three-dimensional crosslinked polymeric network, having an ultra high molecular weight, which confines the aqueous solvent component in its interstices. The polymeric network and aqueous component form a single phase system which provides the gel with its unique phase behavior.

The present gel is qualitatively defined as "flowing" because of its ability to flow into the wellbore and formation under injection pressure. Nevertheless, the gel has sufficient structure as a result of its specific crosslinking mechanism to exhibit characteristics desirable of a fracturing fluid. These characteristics include uniformity, high viscosity, shear thinning and stability during the fracture treatment as well as low fluid loss and friction loss.

The uniform viscous stable gel of the present invention is a particularly effective vehicle for propping agents, which may be employed during the fracture treatment, because the gel is advantageously susceptible to shear thinning. The gel exhibits high apparent viscosity in the wellbore tubulars during injection, but exhibits relatively low apparent viscosity when subjected to high shear as it exits the wellbore perforations and enters the induced fractures. The gel regains its high apparent viscosity as it moves at lower shear through the fractures far into the formation away from the wellbore. The shear thinning gel effectively maintains the proppant in suspension in the wellbore tubulars until the gel enters the induced fractures and again after the gel has traveled into the fractures.

The gel of the present invention is at least partially gelled upon injection into the wellbore. In a partial gel, as defined herein, the crosslinking agent has reacted incompletely with the polymer and neither all of the polymer nor all of the crosslinking agent in the gel is totally consumed by the crosslinking reaction. Although the partial gel exhibits at least some gel-like structure, it is capable of further crosslinking to completion without the addition of more crosslinking agent.

"Crosslinked to completion" means that the gel is substantially incapable of further crosslinking because one or both of the required reactants in the initial solution are substantially consumed. Further crosslinking is only possible if either polymer, crosslinking agent, or both are added to the gel. In a preferred embodiment, the gel of the present invention is crosslinked to substantial completion upon injection into the wellbore.

Complete gelation by the time the gel reaches the induced fractures is advantageous because it promotes efficient proppant transport and reduces fluid loss. Fluid loss can cause significant permeability reduction of the matrix bounding the fracture network which is counterproductive to the fracturing process. Fluid loss can also increase the fracturing fluid requirement of the treatment and cause undesirable proppant bridging in the fractures.

The polymer of the gel may be any crosslinkable, high molecular weight, water-soluble, synthetic polymer and biopolymer containing one or more carboxylate species. The average molecular weight of the carboxylate-containing polymer is in the range of about 10,000 to about 50,000,000 and preferably about 50,000 to about 20,000,000. Synthetic polymers are preferred and the most preferred synthetic polymers are acrylamide polymers, such as polyacryamide, partially hydrolyzed polyacrylamide and terpolymers containing acrylamide, acrylate, and a third species. The average molecular weight range of synthetic polymers is about 100,000 to about 50,000,000 and preferably about 1,000,000 to about 20,000,000.

As defined herein, polyacrylamide (PA) is an acrylamide polymer having substantially less than 3% of the acrylamide groups in the form of carboxylate groups. Partially hydrolyzed polyacrylamide (PHPA) is an acrylamide polymer having at least 3%, but not 100%, of the acrylamide groups in the form of carboxylate groups. The acrylamide polymer may be prepared according to any conventional method known in the art, but preferably has the specific properties of an acrylamide polymer prepared according to the method disclosed by U.S. Pat. No. Re. 32,114 to Argabright et al incorporated herein by reference.

The crosslinking agent is a chromic carboxylate complex. The term "complex" is defined herein as an ion or molecule containing two or more interassociated ionic, radical or molecular species. A complex ion as a whole has a distinct electric charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. Although the complex is not limited to a specific molar ratio of carboxylate to chromium III species, the preferred ratio is less than 4:1 and the most preferred ratio is about 3:1 or less. The complex may advantageously also contain one or more electronegative hydroxide and/or oxygen species. Hydroxide species are preferably provided to the complex as a product of hydrolysis rather than as an alkali.

It is believed that the oxygen or hydroxide species may help to bridge two or more chromium III species and form oligomer complexes. Such complexes have been discovered to be especially effective for the crosslinking of synthetic carboxylate-containing polymers to form stable gels.

Each complex optionally contains additional species which are not essential to the polymer crosslinking function of the complex. For example, inorganic mono- and/or divalent ions, which function merely to balance the electricl charge of the complex, or one or more water molecules may be associated with each complex. Representative formulae of such complexes include:

$[Cr_3(CH_3CO_2)_6(OH)_2]^{+1}$;

$[Cr_3(OH)_2(CH_3CO_2)_6]NO_3 \cdot 6H_2O$;

$[Cr_3(H_2O)_2(CH_3CO_2)_6]^{+3}$;

$[Cr_3(H_2O)_2(CH_3CO_2)_6](CH_3CO_2)_3 \cdot H_2O$; etc.

Trivalent chromium and chromic ion are equivalent terms encompassed by the term chromium III species as used herein. The carboxylate species include the following water-soluble species: formate, acetate, propionate, lactate, substituted derivatives thereof, and mixtures thereof. Acetate is the preferred carboxylate species because of its low cost and high water solubility. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists*, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, *Das Leder*, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and its Compounds*, Reinhold Publishing Corp., N.Y., 1956, pp. 229–233; and Cotton and Wilkinson, *Advanced Inorganic Chemistry 3rd Ed.*, John Wiley & Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

The gel is formed by premixing the gel components, which include the carboxylate-containing polymer, the crosslinking agent, and the aqueous solvent. The gel components may advantageously also include a solid proppant and/or a gel breaker. The components are premixed at the surface to form a homogeneous injectable gelation solution prior to injection. Premixing broadly encompasses inter alia mixing the solution in bulk at the surface prior to injection or simultaneously mixing the solution at or near the wellhead by in-line mixing means while injecting it.

Premixing is accomplished for example by dissolving the starting materials for the crosslinking agent in an appropriate aqueous solvent. Exemplary starting materials include solid $CrAc_3 \cdot H_2O$, solid $Cr_3Ac_7(OH)_2$ or a solution labeled "Chromic Acetate 50% Solution" commercially available, for example, from McGean Chemical Co., Inc., 1250 Terminal Tower, Cleveland, Ohio 44113, U.S.A. The crosslinking agent solution is then mixed with the remaining gel components to produce the gelation solution. Among other alternatives, the starting materials for the crosslinking agent can be dissolved directly in the aqueous polymer solution to form the gelation solution in a single step.

The aqueous solvent of the gelation solution may be deionized water, fresh water or a brine having a total dissolved solids concentration up to the solubility limit of the solids in water.

The breaker is preferably a composition which is sufficiently reactive to effectively break the gel within about 48 hours after the fracture treatment, yet not so reactive that it significantly diminishes the performance properties of the gel during the fracture treatment. Suitable breakers include those known in the art. The gel breaker reverses the gel to a less viscous solution upon completion of the fracture treatment. The less viscous solution is readily removed from the fractures so that injected or produced fluids may flow into or out of the fractures.

The propping agent can be any suitable composition known in the art. Conventional propping agents include sand, glass beads, ceramic beads, cracked walnut shells, etc. The proppant keeps the fractures open without substantially blocking fluid flow after the degraded gel is removed.

The present process enables a practitioner to prepare a fracturing fluid from the above-described components which exhibits effective predetermined performance properties. Effective performance properties include low fluid, low friction loss, high shear thinning, high proppant carrying capacity and a resonable gelation rate.

By reasonable gelation rate, it is meant that the gelation rate is sufficiently slow to enable controlled preparation of the gelation solution at the surface and injection of the gel as a uniform slug into the wellbore. Too rapid a gelation rate may result in a non-homogeneous gel which is undesirable for the present fracture treatment. At the same time, a reasonable gelation rate is sufficiently rapid to provide an operable gel at the time of the fracture treatment. At a reasonable gelation rate, gelation is usually complete within 24 hours or less.

The performance properties correlate with the independent parameters of gel composition and gelation conditions. The operable ranges of the parameters and their correlation to the performance properties are described below.

The lower temperature limit of the gelation solution at the surface is the freezing point of the solution and the upper limit is essentially the thermal stability limit of the polymer. However, the solution is generally maintained at or above ambient temperature at the surface to facilitate gelation within a reasonable time.

The initial pH of the gelation solution can be within a range of about 3 to 13 and preferably about 6 to 13. An alkaline pH, i.e., greater than 7 to about 13, is most preferred because it favors gelation. As a rule, increasing the pH increases the rate of gelation. Nevertheless, pH adjustment of the solution is generally not required by the present invention because the synthetic carboxylate-containing polymer has a large buffering capacity and imparts a pH to the gelation solution within the preferred, if not most preferred, range.

The polymer concentration in the solution is about 500 ppm up to the solubility limit of the polymer in the solvent or the rheological constraints of the polymer solution, preferably about 1000 ppm to about 200,000 ppm, and most preferably about 3000 ppm to about 10,000 ppm. Increasing the polymer concentration at a constant ratio of polymer to crosslinking agent generally improves the performance properties of the gel.

The weight ratio of polymer to complex crosslinking agent is about 1:1 to about 500:1, and preferably about 2.5:1 to about 100:1. Decreasing the ratio generally improves the gel performance properties, especially at a constant high polymer concentration. Increasing the molecular weight of the polymer also improves the gel performance properties. Increasing the degree of hydrolysis of an acrylamide polymer within a range of about 0 to about 5% specifically increases the gelation rate.

With these correlations, one can produce effective fracturing fluids as a function of the gel composition and gelation conditions. Thus, to effect an optimum fracture treatment according to the present process, the practitioner predetermines the performance properties of a gel which are required to meet the fracture treatment demands of the given formation and thereafter produces a gel having these predetermined properties by selecting the gel composition and gelation conditions accordingly.

The pesent process is applicable to fracture treatments of formations under most conditions and is specific to fracturing a formation which is in fluid communication with an injection or production well. The gels are produced in a manner which renders them insensitive to most extreme formation conditions. The gels can be stable at formation temperatures up to 115° C. and beyond and at any formation pH contemplated. The gels are relatively insensitive to oil field fluids and the stratigraphy of the rock. The gels can be employed in carbonate and sandstone strata or strata having varying mineralogy.

Upon completion of the fracturing process, the gels can be removed from the fractures by producing them back through the wellbore. The gels are preferably degraded to a less viscous solution before backflowing. Conventional chemical breakers to degrade the gels are either incorporated into the gelation solution during its preparation or separately injected into the treatment region after the fracture treatment. As an alternative to backflowing, the gels can be degraded and displaced out into the formation away from the treatment region. In any case, the gels do not substantially reduce the permeability of the formation near the wellbore or the resultant fracture after the fracture treatment.

The following examples demonstrate the practice and utility of the present invention, but are not to be construed as limiting the scope thereof.

EXAMPLE 1

A production well is drilled to a depth of 1550 m in a Pennsylvania aged sandstone formation which has a formation temperature of 82° C. and has some natural fracturing. 9.4 m of the well are perforated. The well initially produces 86 liters of oil per hour and 404 liters of water per hour.

The well is hydraulically fractured using a gel comprising 3700 ppm acrylamide polymer, 300 ppm chromic acetate complex, and a produced water solvent at a temperature of 66° C. The acrylamide polymer is a 30% hydrolyzed polyacrylamide having a molecular weight of 11,000,000. The produced water has a total dissolved solids content of 0.58 wt %.

Thirty thousand liters of the gel is injected at 1600 liters per minute. Thereafter, three gel slugs having a volume of 7600 liters each and containing and 8 to 16 mesh sand proppant are injected at the same rate. The first slug has 0.24 kg of sand per liter of gel, the second has 0.48 kg/l, and the third has 0.72 kg/l.

After the hydraulic fracture treatment, production stabilizes at 1,000 liters of oil per hour and 8,200 liters of water per hour.

Most of the following examples are formatted as tables of data which describe the formulation and maturation of one or more gels. Each gel is represented in a table by a single experimental run. Data include the conditions for producing the gel and the quantitive or qualitative strength of the produced gel. The tables display data in a three-tier format. The first tier is the values of the fixed gelation conditions which are constant and common to every run in the table. The second tier is values of the gelation conditions which vary among the different runs in the table but are constant for any given run. The third tier is the gel strength which varies as a function of time within each run. Qualitative gel strength is expressed in alphabetic code. Quantitative gel strength is simply the numerical value of apparent viscosity.

The following gel strength code and nomenclature are useful for interpreting the tables.

Gel Strength Code

A. No detectable continuous gel formed: the bulk of the solution appears to have the same viscosity as the original polymer solution although isolated local gel balls may be present.
B. Highly flowing gel: the gel appears to be only slightly more viscous than the initial polymer solution.
C. Flowing gel: most of the gel flows to the bottle cap by gravity upon inversion.
D. Moderately flowing gel: only a small portion (-10%) of the gel does not readily flow to the bottle cap by gravity upon inversion (usually characterized as a tonguing gel).
E. Barely flowing gel: the gel can barely flow to the bottle cap and/or a significant portion (>15%) of the gel does not flow by gravity upon inversion.
F. Highly deformable nonflowing gel: the gel does not flow to the bottle cap by gravity upon inversion.
G. Moderately deformable nonflowing gel: the gel deforms about half way down the bottle by gravity upon inversion.
H. Slightly deformable nonflowing gel: only the gel surface slightly deforms by gravity upon inversion.
I. Rigid gel: there is no gel surface deformation by gravity upon inversion.
J. Ringing rigid gel: a tuning fork-like mechanical vibration can be felt upon tapping the bottle.

Nomenclature

% Hydrolysis: % of carboxylate groups on the acrylamide polymer based on the total number of acrylamide groups
Polymer MW: average molecular weight of the acrylamide polymer
Polymer Conc: acrylamide polymer concentration in the polymer solution (ppm)
Polymer Solvent: aqueous solvent in the polymer solution
Polymer pH: pH of the polymer solution
Total Ion Conc: total concentration of chromium III and acetate ions in the gelation solution (ppm)
Weight Ratio Polymer:Ions: weight ratio of acrylamide polymer to chromium III and acetate ions in the gelation solution
Metal Ion Conc: chromium III ion concentration in the gelation solution
Temp: gelation temperature (°C.)
Time: gelation time (hr)
Gel Code: gel strength code
Viscosity: apparent viscosity of the gelation solution (cp)
Pressure: viscometer pressure (kPa)

The polymer solutions of the following examples are prepared by diluting aqueous acrylamide polymer solutions with an aqueous solvent. Where qualitative data are obtained, the dilute polymer solution is combined with a crosslinking agent solution in a 0.12 liter wide-mouth bottle to form a 0.5 liter sample. The sample is gelled in the capped bottle and the qualitative gel strength is determined by periodically inverting the bottle.

Where quantitative data are obtained, the polymer solution and crosslinking agent solution are combined in a variable pressure and temperature rheometer (viscometer), having an oscillatory mode of 0.1 rad/sec and 100% strain. The apparent viscosity at a shear rate of about $0.1 \text{ sec}^{-1}$ is recorded as a function of time.

The chromium acetate complex crosslinking agent solution of the present invention is prepared by dissolving solid $CrAc_3.H_2O$ or $CrAc_7(OH)_2$ in water or using a solution obtained commercially under the label of "Chromic Acetate 50% Solution".

EXAMPLE 2

| % Hydrolysis: | 30 |
| --- | --- |
| Polymer MW: | 5,000,000 |
| Polymer Solvent: | Distilled Water |
| Polymer pH: | 8.0 |
| Temp: | rt |
| Weight Ratio Polymer:Ions: | 10 |

| Run Number | 1 |
| --- | --- |
| Metal Ion Conc | 105 |
| Total Ion Conc | 499 |
| Polymer Conc | 5,000 |

| Time | Gel Code |
| --- | --- |
| 0.25 | A |
| 0.5 | A |
| 1.0 | A |
| 2.0 | A |
| 3.0 | A |
| 4.0 | A |
| 5.0 | B |
| 8.0 | B |
| 23 | B |
| 48 | C |

The data show conditions for producing a stable flowing gel.

EXAMPLE 3

| % Hydrolysis: | 30 |
| --- | --- |
| Polymer MW: | 5,000,000 |
| Polymer Solvent: | Actual Field Injection Water A* |
| Temp: | 60** |

| Run Number | 1 |
| --- | --- |
| Polymer Conc | 3000 |
| Polymer pH | 8.5 |
| Metal Ion Conc | 54.5 |
| Total Ion Conc | 240 |
| Weight Ratio Polymer:Ions | 12.5 |

| Time | Gel Code |
| --- | --- |
| 0.5 | A |
| 1.0 | A |
| 1.5 | A |
| 2.0 | B |
| 3.0 | C |
| 4.0 | D |
| 5.0 | D |
| 12 | D |
| 27 | D |

-continued

| 504 | D |
|---|---|

*Actual Field Injection Water A has a TDS of 0.58%, $H_2S$ > 100 ppm, and is comprised of the following primary ionic constituents:

| | ppm |
|---|---|
| $Na^+$ | 252 |
| $Mg^{2+}$ | 97 |
| $Ca^{2+}$ | 501 |
| $Cl^-$ | 237 |
| $SO_4^{2-}$ | 1500 |
| $HCO_3^-$ | 325 |

**Temperature of Field A.

EXAMPLE 4

| % Hydrolysis: | 30 |
|---|---|
| Polymer Solvent: | Synthetic Field Injection Water B* |
| Polymer pH: | 7.5 |
| Temp: | rt** |
| Weight Ratio Polymer:Ions: | 15 |

| Run Number | 1 |
|---|---|
| Polymer MW | 11,000,000 |
| Polymer Conc | 5,000 |
| Metal Ion Conc | 75.7 |
| Total Ion Conc | 333 |

| Time | Gel Code |
|---|---|
| 0.25 | A |
| 0.5 | A |
| 4.0 | A |
| 5.0 | A |
| 6.0 | B |
| 7.0 | C |
| 24 | D |
| 96 | D |
| 150 | D |
| 197 | D |
| 936 | D |

*Synthetic Field Injection Water B has the following composition:

| | g/l |
|---|---|
| $Na_2CO_3$ | 0.249 |
| $NH_4Cl$ | 0.085 |
| $CaCl_2$ | 0.821 |
| $MgCl_2.6H_2O$ | 1.78 |
| $Na_2SO_4$ | 1.09 |
| NaCl | 4.80 |
| $NaHCO_3$ | 2.09 |

**Temperature of Field A.

Examples 3 and 4 show that the concentration and proportion of gel components can be selected to form stable flowing gels even in complex injection waters such as A and B.

EXAMPLE 5

| % Hydrolysis: | 30 |
|---|---|
| Polymer MW: | 11,000,000 |
| Polymer Conc: | 5,000 |
| Polymer Solvent: | Synthetic field injection water C* |
| Polymer pH: | 7.5 |

| Run Number | 1 | 2 | 3 | 4 | 5 | 6 |
|---|---|---|---|---|---|---|
| Metal Ion Conc: | 214 | 143 | 107 | 214 | 143 | 107 |
| Total Ion Conc: | 826 | 552 | 415 | 826 | 552 | 415 |
| Weight Ratio Polymer:Ions: | 6.0 | 9.0 | 12.0 | 6.0 | 9.0 | 12.0 |
| Temp: | rt | rt | rt | 43 | 43 | 43 |

*Synthetic Field Injection Water C has the following composition:

| | g/l |
|---|---|
| $CaSO_4.H_2O$ | 0.594 |
| $MgSO_4$ | 0.788 |
| $NaHCO_3$ | 1.53 |
| $CaCl_2$ | 0.655 |
| $Na_2SO_4$ | 1.52 |
| $K_2SO_4$ | 0.452 |

The gelation solution is aged in a graduated cylinder for 48 hours. 50 additional milliliters of the PHPA solvent are added on top of the gel. The change in the position of the interface between the gel and the solvent in the graduated cylinder is recorded as a function of time.

| | Run Number | | | | | |
|---|---|---|---|---|---|---|
| | 1 | 2 | 3 | 4 | 5 | 6 |
| Time | Change in Positions of Interface (ml) | | | | | |
| 0.0 | 0 | 0 | 0 | 0 | 0 | 0 |
| 8.0 | 0 | 0 | +0.5 | 0 | 0 | +1 |
| 28 | 0 | 0 | 0 | 0 | 0 | 0 |
| 264 | 0 | 0 | +0.5 | 0 | 0 | 0 |
| 528 | +2.0 | +2.5 | +2.5 | +2 | 0 | −1 |

The gel of the present invention appears substantially resistant to water expulsion (syneresis) or swelling upon contact with additional formation water.

EXAMPLE 6

| % Hydrolysis: | 30 |
|---|---|
| Polymer MW: | 5,000,000 |
| Polymer Conc: | 8350 |
| Polymer Solvent: | 5,000 ppm NaCl in aqueous solution |
| Temp: | rt |

| Run Number | 1 | 2 | 3 | 4 | 5 |
|---|---|---|---|---|---|
| Polymer pH | 10.6 | 8.0 | 7.0 | 6.0 | 40.0 |
| Metal Ion Conc | 105 | 105 | 105 | 105 | 105 |
| Total Ion Conc | 500 | 500 | 500 | 500 | 500 |
| Weight Ratio Polymer:Ions | 16.7 | 16.7 | 16.7 | 16.7 | 16.7 |

| Time | Gel Code | | | | |
|---|---|---|---|---|---|
| 0.5 | A | A | A | A | A |
| 1.0 | A | A | A | A | A |
| 1.5 | A | A | A | A | A |
| 2.0 | B | A | A | A | A |
| 2.5 | B | A | A | A | A |
| 4.0 | B | A | A | A | A |
| 5.0 | B | A | A | A | A |
| 6.0 | B | A | A | A | A |
| 7.0 | B | A | A | A | A |
| 8.0 | B | B | B | B | A |
| 24 | E | B | B | B | B |
| 28 | E | B | B | B | B |
| 48 | E | B | B | B | B |
| 80 | G | B | B | B | B |
| 168 | G | C | B | D | B |
| 2040 | G | E | E | E | D |

The data show that gelation rate and gel strength decrease as pH of the polymer solution decreases.

Examples 7-13 show comparative gelation data of gelation solutions containing polymer crosslinking agents known in the art.

EXAMPLE 7

A gelation solution #1 is prepared with the crosslinking agent of the present invention.

| | Solution #1 |
|---|---|
| % Hydrolysis: | 30 |
| Polymer MW: | 5,000,000 |
| Polymer Conc: | 2500 |
| Polymer Solvent: | Actual Field Injection Water A* |

-continued

| Solution #1 | |
|---|---|
| Weight Ratio Polymer:Ions: | 12.5:1** |

A gelation solution #2 is prepared with a chromium VI/redox crosslinking agent used in commercial treatments.

| Solution #2 | |
|---|---|
| % Hydrolysis: | 30 |
| Polymer MW: | 5,000,000 |
| Polymer Conc: | 3500 |
| Polymer Solvent: | Actual Field Injection Water A* |
| Weight Ratio Polymer:Ions: | 30:1** |

Both solutions are subjected to high shear rates and then returned to low shear rates. The result is a thixotropic loop shown in tabular form below.

| | Solution Number | |
|---|---|---|
| | 1 | 2 |
| Shear Rate (sec$^{-1}$) | Viscosity | Viscosity |
| 5 | 5250 | 1800 |
| 10 | 3750 | 1400 |
| 20 | 1900 | 800 |
| 40 | 1200 | 500 |
| 60 | 900 | 400 |
| 80 | 800 | 300 |
| 100 | 600 | 200 |
| 80 | 800 | 200 |
| 60 | 900 | 200 |
| 40 | 1000 | 200 |
| 20 | 1400 | 200 |
| 10 | 2000 | 200 |
| 5 | 3100 | 200 |

*See Example 3 for composition.
**The weight ratio selected for each solution is optimized for the solvent.

The gel of the present invention (solution #1) demonstrates an ability to partially reheal after returning to a low shear rate. The gel of solution #2 is totally non-rehealing, i.e., the viscosity of final sheared solution #2 is similar to an uncrosslinked polymer solution of the same concentration.

EXAMPLE 8

The crosslinking agent of the present example is a 5% by wt. aluminum acetate solution.

| % Hydrolysis: | 30 |
|---|---|
| Polymer MW: | 5,000,000 |
| Polymer Conc: | 8400 |
| Polymer Solvent: | 5,000 ppm NaCl in aqueous solution |
| Polymer pH: | 7.0 |
| Temp: | rt |

| Run Number | 1 | 2 | 3 |
|---|---|---|---|
| Total Conc of Aluminum III and Acetate Ions in Gelatin Solution (ppm) | 5000 | 250 | 100 |
| Weight Ratio of Polymer to Aluminum III and Acetate Ions in Gelatin Solution | 1.7 | 34 | 84 |

Local gel balls form immediately in all three samples upon addition of the crosslinking agent solution to the polymer solution. However, a continuous gel does not form in any of the samples, even upon prolonged standing.

The crosslinking agent of Examples 9–12 is a 25% by wt. aluminum citrate solution.

EXAMPLE 9

| % Hydrolysis: | 30 |
|---|---|
| Polymer MW: | 5,000,000 |
| Polymer Conc: | 8350 |
| Polymer Solvent: | 5,000 ppm NaCl in aqueous solution |
| Polymer pH: | 4.0 |
| Temp: | rt |
| Metal Ion: | Aluminum III |
| Total Ions: | Aluminum III and Citrate |

| Run Number | 1 | 2 | 3 | 4 | 5 | 6 | 7 |
|---|---|---|---|---|---|---|---|
| Metal Ion Conc | 12.5 | 31 | 63 | 125 | 250 | 500 | 1000 |
| Total Ion Conc | 100 | 250 | 500 | 1000 | 2000 | 4000 | 8000 |
| Weight Ratio Polymer:Ions | 84 | 33 | 16.7 | 8.4 | 4.2 | 2.1 | 1.05 |
| Time | | | Gel Code | | | | |
| 0.5 | A | A | A | A | B | B | B |
| 0.75 | A | A | A | B | C | C | C |
| 1.75 | A | A | B | B | C | C | D |
| 2.5 | A | A | B | B | C | C | D |
| 3.0 | A | A | B | B | C | D | E |
| 3.5 | A | A | B | B | C | D | E |
| 4.5 | A | A | B | B | D | D | F |
| 6.0 | A | A | B | B | D | D | G |
| 24 | A | A | B | B | D | D | H |
| 48 | A | A | B | B | D | E | H |
| 71 | A | A | B | B | C | H | I |
| 166 | A | A | B | B | D | H | I |

EXAMPLE 10

| % Hydrolysis: | 30 |
|---|---|
| Polymer MW: | 5,000,000 |
| Polymer Conc: | 6000 |
| Polymer Solvent: | Actual Field Injection Water A* |
| Polymer pH: | 9.1 |
| Metal Ion: | Aluminum III |
| Total Ions: | Aluminum III and Citrate |

| Run Number | 1 | 2 | 3 |
|---|---|---|---|
| Metal Ion Conc | 186 | 373 | 845 |
| Total Ion Conc | 1490 | 2980 | 5960 |
| Weight Ratio Polymer:Ions | 4.0 | 2.0 | 1.0 |
| Temp | 60 | 60 | 60 |
| Time | | Gel Code | |
| 0.5 | B | B | B |
| 1.0 | B | B | B |
| 2.0 | B | B | B |
| 3.0 | C | C | C |
| 4.0 | C | C | C |
| 5.0 | C | D | D |
| 6.0 | D | D | D |
| 24 | F | F | F |
| 48 | C | C | D |
| 120 | C | C | D |
| 172 | C | C | D |
| 216 | C | B | B |

*See Example 3 for composition.

EXAMPLE 11

| % Hydrolysis: | 30 |
|---|---|
| Polymer MW: | 5,000,000 |
| Polymer Conc: | 6000 |
| Polymer Solvent: | Actual Field Injection Water A* |
| Polymer pH: | 4.0 |
| Metal Ion: | Aluminum III |
| Total Ions: | Aluminum III and Citrate |

| Run Number | 1 | 2 | 3 | 4 | 5 | 6 |
|---|---|---|---|---|---|---|
| Metal Ion Conc | 186 | 373 | 745 | 186 | 373 | 745 |
| Total Ion Conc | 1490 | 2980 | 5960 | 1490 | 2980 | 5960 |
| Weight Ratio | 4.0 | 2.0 | 1.0 | 4.0 | 2.0 | 1.0 |

-continued

| Polymer:Ions Temp | rt | rt | rt | 60 | 60 | 60 |
|---|---|---|---|---|---|---|
| Time | | | Gel Code | | | |
| 0.25 | C | C | D | C | C | C |
| 0.50 | D | E | E | D | D | E |
| 1.0 | D | E | E | D | D | F |
| 2.0 | F | F | G | B | B | C |
| 3.0 | F | H | H | A | A | C |
| 4.0 | H | H | H | A | A | C |
| 5.0 | H | H | H | A | A | C |
| 6.0 | H | H | H | A | A | B |
| 24 | F | G | H | A | A | A |
| 48 | F | G | H | — | — | — |
| 120 | B | F | F | — | — | — |

*See Example 3 for composition.

EXAMPLE 12

| % Hydrolysis: | 30 |
|---|---|
| Polymer MW: | 5,000,000 |
| Polymer Conc: | 25,000 ppm |
| Polymer Solvent: | Denver Tap Water |
| Polymer pH: | 9.6 |
| Metal Ion: | Aluminum III |
| Total Ions: | Aluminum III and Citrate |

| Run Number | 1 | 2 | 3 | 4 | 5 | 6 | 7 | 8 |
|---|---|---|---|---|---|---|---|---|
| Metal Ion Conc | 462 | 925 | 1850 | 3700 | 462 | 925 | 1850 | 3700 |
| Total Ion Conc | 3700 | 7400 | 14,800 | 29,600 | 3700 | 7400 | 14,800 | 29,600 |
| Weight Ratio Polymer:Ions | 6.8 | 3.4 | 1.7 | 0.84 | 6.7 | 3.3 | 1.7 | 0.84 |
| Temp | rt | rt | rt | rt | 60 | 60 | 60 | 60 |
| Time | | | | Gel Code | | | | |
| 0.5 | A | A | A | A | A | A | A | A |
| 1.0 | A | A | A | A | A | A | A | A |
| 2.0 | A | A | A | A | A | A | A | A |
| 3.0 | I | A | A | A | A | A | A | A |
| 4.0 | I | I | I | I | I | I | I | I |
| 5.0 | I | I | I | I | I | I | I | I |
| 6.0 | I | I | I | I | I | I | I | I |
| 55 | I | I | I | I | E | E | C | C |
| 104 | D | C | C | C | E | E | C | C |
| 168 | D | C | C | C | E | E | C | C |
| 288 | D | C | C | C | E | E | D | C |

Examples 9–12 show that flowing PHPA/aluminum citrate gels are favored by an acidic pH, e.g., around 4, and often require large amounts of aluminum citrate. Acidic pH conditions are particularly unsuitable to subterranean applications because they require acidic brines which are incompatible with many reservoirs. Acidic brines attack the formation, e.g., carbonates and dolomites, found either in the matrix or cementing material. Furthermore, low pH tends to precipitate the PHPA. Most reservoirs are neutral or slightly basic and consume hydrogen ions rendering acidic gel formulations basic and inoperative.

PHPA/aluminum citrate gels also exhibit unacceptable instability.

EXAMPLE 13

| % Hydrolysis: | 30 |
|---|---|
| Polymer MW: | 5,000,000 |
| Polymer Conc: | 8350 |
| Polymer Solvent: | 5,000 ppm NaCl in aqueous solution |
| Temp: | rt |

| Run Number | 1 | 2 |
|---|---|---|
| Crosslinking Ions | CrIII, Cl⁻ | CrIII, NO₃⁻ |
| Metal Ion Conc | 52.5 | 52.5 |
| Total Ion Conc | 270 | 405 |
| Weight Ratio | 30.1 | 20.6 |

-continued

| PHPA:Ions | | |
|---|---|---|
| Time | Gel Code | |
| 1.0 | A | A |
| 2.0 | A | A |
| 3.0 | A | A |
| 4.0 | A | A |
| 6.0 | A | A |
| 9.0 | A | A |
| 24 | A | A |
| 48 | A | A |
| 96 | A | A |
| 336 | A | A |
| 672 | A | A |

Crosslinking occurs so rapidly that local gel balls form around the crosslinking agent solutions as they are added to the polymer solution preventing effective mixing and continuous gel formation.

While the foregoing preferred embodiments of the invention have been described and shown, it is understood that the alternatives and modifications, such as those suggested and others, may be made thereto and fall within the scope of the invention.

I claim:

1. A fracturing process applied to a subterranean hydrocarbon-bearing formation below an earthen surface in fluid communication with a wellbore comprising:
    (a) premixing a fracturing fluid at the surface comprising a gel breaker and a gelation solution consisting essentially of an aqueous solvent, a water-soluble acrylamide polymer selected from the group consisting of polyacrylamide and partially hydrolyzed polyacrylamide, and a crosslinking agent formed of at least one chromium III species complexed with at least one carboxylate species selected from the group consisting of propionate, acetate, lactate, and mixtures thereof;
    (b) at least partially gelling said gelation solution at the surface to form a gel; and
    (c) injecting said fracturing fluid into said formation via said wellbore at a pressure sufficient to hydraulically fracture said formation.

2. The process of claim 1 wherein said gel is substantially completely gelled upon injection into said wellbore.

3. The process of claim 1 wherein said at least partially gelled gel is gelled to completion after injection into said wellbore.

4. The process of claim 1 wherein said at least one carboxylate species is acetate.

5. The process of claim 1 wherein the pH of said gelation solution is at least about 7.

6. The process of claim 5 wherein the molar ratio of said acetate to chromium III species in said complex is less than 4.0:1.

7. The process of claim 1 wherein said fracturing fluid further comprises a solid proppant.

8. A fracturing process applied to a subterranean hydrocarbon-bearing formation below an earthen surface in fluid communication with a wellbore comprising:
(a) premixing a fracturing fluid at the surface comprising a gel breaker and a gelation solution consisting essentially of an aqueous solvent, a water-soluble acrylamide polymer selected from the group consisting of polyacrylamide and partially hydrolyzed polyacrylamide, and a crosslinking agent formed of at least one chromium III species complexed with at least one carboxylate species, selected from the group consisting of propionate, acetate, lactate, and mixtures thereof, and at least one species selected from the group consisting of electronegative oxygen species, electronegative hydroxide species, inorganic monovalent ions, inorganic divalent ions, water molecules, and mixtures thereof;
(b) at least partially gelling said gelation solution at the surface to form a gel; and
(c) injecting said fracturing fluid into said formation via said wellbore at a pressure sufficient to hydraulically fracture said formation.

9. The process of claim 8 wherein said gel is substantially completely gelled upon injection into said wellbore.

10. The process of claim 8 wherein said at least partially gelled gel is gelled to completion after injection into said wellbore.

11. The process of claim 8 wherein said at least one carboxylate-containing species is acetate.

12. The process of claim 8 wherein the pH of said gelation solution is at least about 7.

13. The process of claim 11 wherein the molar ratio of said acetate to chromium III species in said complex is less than 4.0:1.

14. The process of claim 8 wherein said fracturing fluid further comprises a solid proppant.

* * * * *

UNITED STATES PATENT AND TRADEMARK OFFICE
CERTIFICATE OF CORRECTION

PATENT NO. : 4,779,680

DATED : October 25, 1988

INVENTOR(S) : Robert D. Sydansk

It is certified that error appears in the above-identified patent and that said Letters Patent is hereby corrected as shown below:

Col. 3, line 34:   Delete "electric" and insert --electrical--.
Col. 3, line 62:   Delete "electricl" and insert --electrical--.
Col. 6, line 58:   After "containing" delete "and" and insert --an--.
Col. 7, line 26:   Delete "(-10%)" and insert --( 5-10%)--.
Col. 8, line 6:    Delete "0.5" and insert --0.05--.
Col. 10, line 34:  Under "Run Number 5" delete "40.0" and insert --4.0--.
Col. 15, line 11:  Delete "claim 5" and insert --claim 4--.

Signed and Sealed this

Seventh Day of March, 1989

Attest:

DONALD J. QUIGG

Attesting Officer     Commissioner of Patents and Trademarks